United States Patent
Gorbach et al.

(10) Patent No.: US 9,670,808 B2
(45) Date of Patent: Jun. 6, 2017

(54) SEPARATOR AND METHOD FOR SEPARATING LIQUID DROPLETS FROM AN AEROSOL

(71) Applicant: ElringKlinger AG, Dettingen (DE)

(72) Inventors: Gabriele Gorbach, Reutlingen (DE); Holger Coolens, Tuebingen (DE); Manfred Piesche, Stuttgart (DE); Malte Junker, Stuttgart (DE)

(73) Assignee: ElringKlinger AG, Dettingen (DE)

( * ) Notice: Subject to any disclaimer, the term of this patent is extended or adjusted under 35 U.S.C. 154(b) by 196 days.

(21) Appl. No.: 14/549,864

(22) Filed: Nov. 21, 2014

(65) Prior Publication Data
US 2015/0075377 A1    Mar. 19, 2015

Related U.S. Application Data (63) Continuation of application No. PCT/EP2013/060207, filed on May 16, 2013.

(30) Foreign Application Priority Data

May 29, 2012    (DE) .......................... 10 2012 104 598

(51) Int. Cl.
*B01D 45/12* (2006.01)
*F01M 13/04* (2006.01)
(Continued)

(52) U.S. Cl.
CPC ............. *F01M 13/04* (2013.01); *B01D 45/14* (2013.01); *B04B 5/12* (2013.01);
(Continued)

(58) Field of Classification Search
CPC ........... F01M 13/04; F01M 2013/0422; B01D 45/14; B04B 5/12; B04B 2005/125; C04B 38/0006; C04B 41/009
See application file for complete search history.

(56) References Cited

U.S. PATENT DOCUMENTS

| 715,493 A | 12/1902 | Lundstrom |
| 3,408,796 A * | 11/1968 | Murray ................. B01D 45/14 415/121.2 |

(Continued)

FOREIGN PATENT DOCUMENTS

| DE | 158 849 | 3/1905 |
| DE | 14 17 680 | 10/1968 |

(Continued)

*Primary Examiner* — Dung H Bui
(74) *Attorney, Agent, or Firm* — Womble Carlyle Sandridge & Rice LLP (57) ABSTRACT

A separator for separating liquid droplets from an aerosol is provided, including a rotor arranged in a housing and including a plurality of parallel disks, a dirty gas inlet, a clean gas outlet, and an annular space between the rotor's circumference and the housing, wherein adjacent disks form an interspace therebetween, the radially outer area of the interspace opening into the annular space, and wherein one of the dirty gas inlet and the clean gas outlet communicates with the annular space and the other communicates with radially inner areas of the interspaces. The disks have flat disk bodies perpendicular to the rotor axis, and between adjacent disk bodies, there are a plurality of adjacent channels allowing passage of the gas to be cleaned. Each channel is curved and the radially outer channel wall forms an impaction and separation surface for the liquid droplets.

22 Claims, 6 Drawing Sheets

(51) Int. Cl.
  *B04B 5/12* (2006.01)
  *B01D 45/14* (2006.01)
  *C04B 41/00* (2006.01)
  *C04B 38/00* (2006.01)

(52) U.S. Cl.
  CPC ..... *B04B 2005/125* (2013.01); *C04B 38/0006* (2013.01); *C04B 41/009* (2013.01); *F01M 2013/0422* (2013.01)

(56) References Cited

U.S. PATENT DOCUMENTS

| | | | | |
|---|---|---|---|---|
| 5,755,096 A * | 5/1998 | Holleyman | ............ | B01D 45/14 55/407 |
| 6,602,180 B2 * | 8/2003 | Herman | ............ | B04B 1/04 184/6.24 |
| 6,652,439 B2 * | 11/2003 | Herman | ............ | B04B 1/04 184/6.24 |
| 6,821,319 B1 * | 11/2004 | Moberg | ............ | B01D 45/14 55/385.3 |
| 7,338,546 B2 * | 3/2008 | Eliasson | ............ | B01D 45/14 55/406 |
| 7,396,325 B2 | 7/2008 | Meinig et al. | | |
| 2001/0016549 A1 * | 8/2001 | Herman | ............ | B04B 1/08 494/49 |
| 2008/0034717 A1 * | 2/2008 | Yun | ............ | B01D 45/14 55/437 |
| 2008/0250933 A1 * | 10/2008 | Yun | ............ | B01D 45/14 96/251 |
| 2009/0266231 A1 * | 10/2009 | Franzen | ............ | B01D 45/14 95/68 |
| 2012/0067788 A1 * | 3/2012 | Boele | ............ | B01D 45/14 209/132 |

FOREIGN PATENT DOCUMENTS

| | | |
|---|---|---|
| GB | 709646 | 6/1954 |
| WO | WO 01 36103 | 5/2001 |
| WO | WO 2005/046879 | 5/2005 |

* cited by examiner

SEPARATOR AND METHOD FOR SEPARATING LIQUID DROPLETS FROM AN AEROSOL

CROSS-REFERENCE TO RELATED APPLICATIONS

The present application is a continuation of international application number PCT/EP2013/060207, filed on May 16, 2013, which claims priority to German patent application number 10 2012 104 598.4, filed May 29, 2012, the entire specification of both being incorporated herein by reference.

BACKGROUND OF THE INVENTION

The invention relates to a separator for separating liquid droplets from an aerosol, and relates in particular to an oil separator for the crankcase ventilation gases of a reciprocating internal combustion engine, comprising a rotor arranged in a stationary housing and capable of being driven in rotation about a rotor axis, said rotor comprising a plurality of disks which are concentric with the rotor axis and are arranged parallel to one another, said disks together forming a stack of disks capable of being driven in rotation about the rotor axis and being arranged at in particular equal distances relative to one another in a direction of the rotor axis, a gas flow path between a dirty gas inlet of the separator for a gas entraining liquid droplets to be separated and a clean gas outlet of the separator for the gas cleaned, at least to a large extent, of the liquid droplets, a liquid outlet for discharging separated liquid from the housing, and an annular space between the circumference of the rotor and a circumferential wall of the housing enclosing the rotor, wherein the liquid outlet is in communication with the annular space and disks adjacent to each other in each case form therebetween an interspace that is concentric with the rotor axis and through which the gas is to flow, the radially outer area of said interspace opening into the annular space, and wherein one of the dirty gas inlet and the clean gas outlet is in communication with the annular space and the other one of the dirty gas inlet and the clean gas outlet is in communication with radially inner areas of the interspaces.

Such a separator, having its rotor disk stack formed by conical, namely frusto-conical disks, is known from WO 01/36103 A. As shown in FIG. 1 of said document, all of the frusto-conical disks are arranged along the rotor axis at such distances from one another that their cone angle opens out in the same axial direction and disks adjacent to each other interengage in an axial direction such that when seen in a radial direction the frusto-conical areas of disks adjacent to each other overlap to the largest extent. As is apparent from FIG. 1, the separation action of this known separator relies on the following principle: As the rotor rotates and when the gas to be cleaned flows through the interspaces between the disks adjacent to one another, liquid droplets entrained by the gas to be cleaned are thrown against the inner wall surfaces of the conical disks due to the centrifugal forces to which they are subjected, whereby liquid droplets are separated out on these inner wall surfaces, forming liquid films thereon which are transported to the outer circumference of the rotor by the centrifugal forces, whereupon the separated liquid is spun off the rotor radially outwardly therefrom, thereby at least in part impacting against the circumferential wall of the housing. From the annular space between the rotor and the housing and from the housing's circumferential wall, the separated liquid is then carried by gravity into the housing lower portion and leaves the housing via the liquid outlet thereof.

As is apparent from the section taken along line 2-2 of FIG. 1, depicted in FIG. 2, the inner (i.e. in FIG. 1 upper) wall surfaces of the cone-shaped disks have ribs arranged thereon which, as seen in a direction of the rotor axis, are curved in the shape of a crescent and whose purpose and mechanism of action are apparent from page 12, lines 22 to 26 of WO 01/36103 A: Liquid droplets that have been separated out on the conical inner wall surfaces of the disks in the above-described manner are captured by and conducted along these ribs towards the outer circumference of the disks, with the separated liquid droplets coalescing into larger droplets or amounts of liquid which are then spun off the rotor. The ribs act as flow guiding elements for partial gas streams formed by the gas flowing through the interspaces between disks adjacent to one another, and consequently when seen in a direction of the rotor axis the flow paths for the partial gas streams extending between the ribs take a curved shape (see p. 11, lines 19 to 21). However, according to the basic principle of this known separator, the liquid droplets to be separated are exclusively or at least for the most part separated out on the conical inner surfaces of the disks and only then reach the ribs, where they accumulate and coalesce to form larger droplets or amounts of liquid (see in particular claim 1, namely p. 16, lines 15 to 17 and 26 to 30, and p. 5, lines 2 to 5 and 7 to 11).

For the cleaning of what are known as blow-by gases as occur in reciprocating internal combustion engine crankcase ventilation, powered separators such as separators of the kind defined at the outset are used in the commercial vehicle field, whereas for smaller engines as are employed in passenger cars, passive separators are used, more recently separators in particular whose separating system is formed by a combination of an impactor (impaction plate or the like) and a non-woven fibrous material. However, the relatively high pressure loss in the gas stream of the blow-by gases that is caused by the presence of such passive separators may be disadvantageous and the separation efficiency of such passive systems on material in the ultra-fine droplet range with droplets sized approximately 0.7 μm or less is in need of improvement; any improvement in this regard has heretofore required the use of powered separators, in particular separators of the kind as are apparent from WO 01/36103 A. However, as a result of the conical shape of their disks, these known separators have a relatively large axial overall length relative to the number of disks required for the desired separation efficiency, this being perceived as a disadvantage, in particular where passenger cars are concerned, and reducing the axial overall length by reducing the number of disks has a detrimental effect on the separation performance of such separators. Moreover, known separators as are apparent from WO 01/36103 A are very sensitive to variations with time of the magnitude of the volumetric flow rate of the gases to be cleaned.

Therefore, the object underlying the invention is to propose an improved separator of the kind defined at the outset which has, in principle, a better separation performance for the same overall size and under the same operating conditions than has a separator provided with conical disks.

SUMMARY OF THE INVENTION

This object can be achieved in accordance with the invention by a separator of the kind defined at the outset, said separator being distinguished in that the disks thereof have flat disk bodies which extend in planes perpendicular to the rotor axis, in that at least in a plurality of the interspaces between two disk bodies adjacent to each other there are provided in each case a plurality of channels adjacent to one another and allowing passage therethrough of the gas to be cleaned, in that each channel extends at least substantially from a first radial area to a second radial area of the interspace, with the two areas being arranged at a radial distance from each other, in that each channel is curved when viewed in a direction of the rotor axis, and in that between channel wall surfaces bounding the channel width on either side, the radially outer one forms an impaction and separation surface for the liquid droplets entrained by the gas to be cleaned.

The invention further relates to a method for separating liquid droplets from an aerosol, in particular for separating oil droplets from crankcase ventilation gases of a reciprocating internal combustion engine, by way of a separator comprising a rotor arranged in a stationary housing and capable of being driven in rotation about a rotor axis, said rotor comprising a plurality of disks which are concentric with the rotor axis and are arranged parallel to and axially spaced apart from one another, said disks in each case forming therebetween an interspace concentric with the rotor axis, said method being in accordance with the invention configured such that a plurality of partial gas streams formed by the gas to be cleaned are directed along flow paths extending at least substantially from a radially inner to a radially outer area of an interspace and are flowed simultaneously between flat disk bodies of the disks perpendicular to the rotor axis through the interspaces, wherein in a view of a disk in a direction of the rotor axis said flow paths are adjacent to one another and curved in the same sense such that when the rotor rotates, liquid droplets entrained in the partial gas streams are, by the centrifugal and Coriolis forces acting upon them, at least for the most part separated out on impaction surfaces which bound the flow paths outwardly in a radial direction.

The following advantages can be achieved by the invention: With a separator constructed in accordance with the invention having a geometry of the channels in accordance with the invention it is possible to achieve, for the same available axial installation space and under the same operating conditions, a considerably higher separation performance than is possible with the separator which is apparent from WO 01/36103 A and which as a result of the conical shape of the disks thereof has less installation space available for accommodating surfaces serving the separation of liquid droplets, meaning in other words that in a separator constructed in accordance with the invention, the effective surface area for droplet separation is, for the same axial installation space, larger than that in a separator having conical disks.

Furthermore, in a separator constructed in accordance with the invention, the separation performance thereof can be flexibly adapted to suit different requirements by modifying the channel geometry, in particular the curvature of the channels, and, as will become apparent from the discussion to follow, the separator's basic principle in accordance with the invention allows, by the configuration and number of channels, not only the separation performance for fine and ultra-fine liquid droplets to be increased, but also the effects of variations with time of the volumetric flow rate of the gas to be cleaned on the separation performance of the separator to be reduced—with the latter being achieved by a special channel geometry which results in the liquid droplets to be separated being subjected, in addition to the centrifugal forces imposed thereon, to the action of Coriolis force in the sense that the liquid droplets are, at least for the most part and to the largest extent, separated out on impaction surfaces which bound the channels or flow paths for the partial gas streams outwardly in a radial direction.

With respect to the terms used at the outset and in characterizing the invention, the following should be noted.

Where reference is made at the outset to the liquid outlet being in communication with the annular space and to one of the dirty gas inlet and the clean gas outlet being in communication with the annular space and the other one of the dirty gas inlet and the clean gas outlet being in communication with radially inner areas of the interspaces, this is to be understood to mean that separated liquid accruing in the annular space can be removed from the separator via the liquid outlet, that the gas to be cleaned can be directed from the dirty gas inlet via any flow paths to the radially inner areas of the interspaces or into the annular space and that the cleaned gas is conducted from the radially inner areas of the interspaces via any flow paths to the clean gas outlet or is discharged from the annular space and out of the separator via the clean gas outlet.

The disk bodies characterized as being flat need not be absolutely planar on one or both sides thereof even when leaving aside the means required for forming the channels.

In preferred embodiments of the separator constructed in accordance with the invention, all of the channels extend at least substantially from a radially inner area to a radially outer area of an interspace accommodating these channels. However, the channels constructed in accordance with the invention and provided in such an interspace need not extend from the centers of the disks bounding the interspace to the circumferential peripheries of these disks but may already terminate at a radial distance from the disk centers or inner circumference of the disks and/or at a distance from the outer circumference of the rotor.

In preferred embodiments of the separator constructed in accordance with the invention, each of the channels is continuously curved, meaning that when seen in a direction of the rotor axis, such channel has no longitudinal section that extends for example along a straight or kinked path, because this would unnecessarily deteriorate the separation efficiency.

In embodiments of the separator constructed in accordance with the invention which are preferable because of their separation performance, each channel, starting from its radially inner end, bends in a circumferential direction of the rotor and is curved such that with increasing radial distance from the rotor axis, the direction of the channel forms an increasingly smaller angle with this circumferential direction of the rotor. In this regard, this circumferential direction of the rotor is understood to be in particular the direction of rotation thereof, even though in principle the rotor's direction of rotation may be in the opposite direction, which however will result in reduced separation performance under operating conditions that are otherwise the same.

Utilization of the installation space available for the separator constructed in accordance with the invention to the optimum in terms of separation performance is achieved in preferred embodiments in which, when viewed in a direction of the rotor axis, each channel is bounded by two channel walls or channel wall surfaces and a center line of the channel extending therebetween forms at least approximately at least a portion of a spiral (for example a logarithmic spiral) or of a circular arc. Preferred spirals are an Archimedean spiral or an involute, with the involute leading to optimum results in terms of separation performance of the separator constructed in accordance with the invention; in this connection it is to be noted that channels following an approximately involute course provide an increase in the number of channels that may be accommodated in an interspace between two disks adjacent to one another in a rotor of given outer diameter when compared to any other channel geometry and this has a positive effect on the separation performance of the separator.

In view of the desirable goal of achieving as high a separation performance as possible of the separator constructed in accordance with the invention, it is advantageous if, when viewed in a direction of the rotor axis, each channel has a width that is at least nearly constant along the channel. However, this does not mean that the channel width need be exactly constant; rather, the channel width may for example be somewhat smaller in a radially inner channel area than in a radially outer channel area, and while a constant channel width is desirable, there are limits to that, dictated by fabrication tolerances as well as by localized differential shrinkage as may occur in a disk constructed in accordance with the invention that is manufactured as an injection-molded part. However, along the length of a channel, the width thereof should not vary by more than ¼ of the mean channel width.

The smaller the channel width, the better the separation performance of a separator constructed in accordance with the invention; furthermore, a smaller channel width provides an increase in the number of channels that may be accommodated in the interspace between two disks adjacent to one another, this being true in particular of channels that extend along an involute course. Increasing the number of channels also allows the pressure loss in the gas flow caused by the separator to be reduced. In a separator constructed in accordance with the invention, the channel width (as seen in a direction of the rotor axis) should be no greater than 15 mm, and in preferred embodiments the channel width is no greater than 4 mm, preferably no greater than 2 mm, with channel widths of approximately 1.0 to approximately 1.5 mm being even more preferable. However, fabrication technology places limits on how far channel width can be reduced; therefore, the channel width should be at least approximately 0.1 mm, preferably at least approximately 0.5 mm and in particular at least approximately 1 mm. While relatively large channel widths of for example 5 to 15 mm are possible in principle, a separator constructed in accordance with the invention will, in terms of separation performance and separation capacity for fine and ultra-fine liquid droplets, increasingly lose its superiority over passive separating systems as described hereinabove, as the channel width is increased beyond a value of 4 mm.

Embodiments of the separator constructed in accordance with the invention are recommended in which, in an interspace, the height of the channels as measured in a direction of the rotor axis is constant and is the same for all channels provided between two disk bodies adjacent to each other. In preferred embodiments of the separator constructed in accordance with the invention, the height of all of the channels provided in all of the interspaces is made the same size, and this provides a way of getting closer to the goal of distributing the gas to be cleaned as uniformly as possible to all channels. In order to avoid flow of the gas to be cleaned past the channels in approximately radial direction to any significant degree or to any degree at all, the height, as measured in a direction of the rotor axis, of the channel wall surfaces or channel walls provided between two disk bodies adjacent to one another and bounding the channels should be at least nearly equal or, better, in fact equal to the axial distance of these disk bodies from each other in order thereby to optimize the separation efficiency of the separator.

As is apparent from the foregoing, embodiments to be recommended are those in which each channel is bounded by two channel walls that are at least substantially parallel to each other.

From the separation principle of the separator constructed in accordance with the invention it follows that in terms of the separation performance thereof, it is particularly advantageous for the channel walls to extend along a course transverse and in particular at least nearly perpendicular to a plane defined by a disk body. A course in a direction transverse to such a plane is to be understood such that a channel wall can also form a small acute angle with the perpendicular to the disk body plane, and in this connection it is to be noted that where the injection molding process is used to manufacture the disk bodies and channels, it is unavoidable for the channel walls to form some angle, albeit quite small, with the perpendicular to the disk body plane in order to enable remolding of the part manufactured by injection molding.

Regarding the separation performance of a separator constructed in accordance with the invention, considerable advantages are gained if the channel height (measured in a direction of the rotor axis) is substantially larger than the channel width and is in particular approximately a multiple of the channel width. In this connection, the following is to be pointed out: Due to the effect of the Coriolis force, a channel has induced therein a secondary flow in the gas flowing therethrough, said secondary flow (when viewed in a section taken through the channel in a direction perpendicular to the channel axis) consisting of at least two vortices lying side-by-side between the channel wall surfaces bounding the channel width; however, the effects of this secondary velocity on the separation performance of the separator are significant only in the lateral peripheral regions of the channel, i.e. in the vicinity of the channel wall surfaces bounding the channel width, because it is there that the highest flow velocities of the secondary flow occur. Since this secondary velocity has a negative effect on the separation efficiency, it is desirable for the channel cross-section to be configured such that the ratio between the channel cross-sectional areas of high secondary velocity and the total cross-section of the channel is relatively small. It is therefore advantageous for the channel width to be substantially smaller than the channel height. On the other hand, too high a channel height-to-channel width ratio can, under certain circumstances, cause the gas flow in the channel to destabilize, which results in a larger number of vortex systems and may cause degradation of the separation efficiency of the separator. It is therefore recommended for the ratio of channel height to channel width to be selected to be no greater than 5:1.

From the above-described principle of the separation mechanism of the separator constructed in accordance with the invention it is apparent that such a course or such a curvature of the channels or channel walls is desirable which, when seen in a direction of the rotor axis, results in the radial vector pointing from the rotor axis to a liquid droplet to be separated forming as small as possible an angle with the surface normal of the adjacent channel wall section, i.e. with the perpendicular to the channel wall section immediately adjacent to said liquid droplet, because an optimal separation effect is attained with a surface normal that extends parallel to the radial vector.

As previously mentioned, for reasons of fabrication the channel width cannot be reduced to any size. Therefore, particularly advantageous embodiments of the separator constructed in accordance with the invention are configured such that at least two disk bodies adjacent to each other are provided, on the sides thereof facing each other, with web-shaped walls which, when viewed in a direction of the rotor axis, extend along a course corresponding to the shape of the channels, and are further configured such that the height of these walls, measured in a direction of the rotor axis, is at least nearly equal to the axial distance of these disk bodies from each other, and are configured such that, when seen in a direction of the rotor axis, in at least a plurality of channels the walls of the one disk body are at least substantially centrally arranged between the walls of the other disk body. In such a separator, the width of the channels formed by one disk can be approximately twice the width of the channels formed in the interspace between two disk bodies adjacent to each other so that the latter channels can have a channel width smaller than allowed by fabrication technology for the width of channels formed on a disk. However, in this connection it should be pointed out that not each channel need be bounded by webs one of which is provided on the one disk body and the other of which is provided on the other disk body; rather, an interspace between two disk bodies adjacent to each other can have provided therein both channels that are bounded by webs of only the one disk body and channels that are bounded on the one hand by a web of the one disk body and on the other hand by a web of the other disk body so that the one channels have a channel width that is, for example, approximately twice that of the other channels.

As previously mentioned, a further object of the invention is the method as defined hereinbefore, and all of what has been said or will be said in respect of the separator constructed in accordance with the invention applies to the method accordingly.

Other features, details and advantages of the invention will become apparent from the appended claims and the accompanying drawing of some preferred embodiments of the separator constructed in accordance with the invention and the following description of these embodiments.

DETAILED DESCRIPTION OF THE INVENTION

Figure 1:
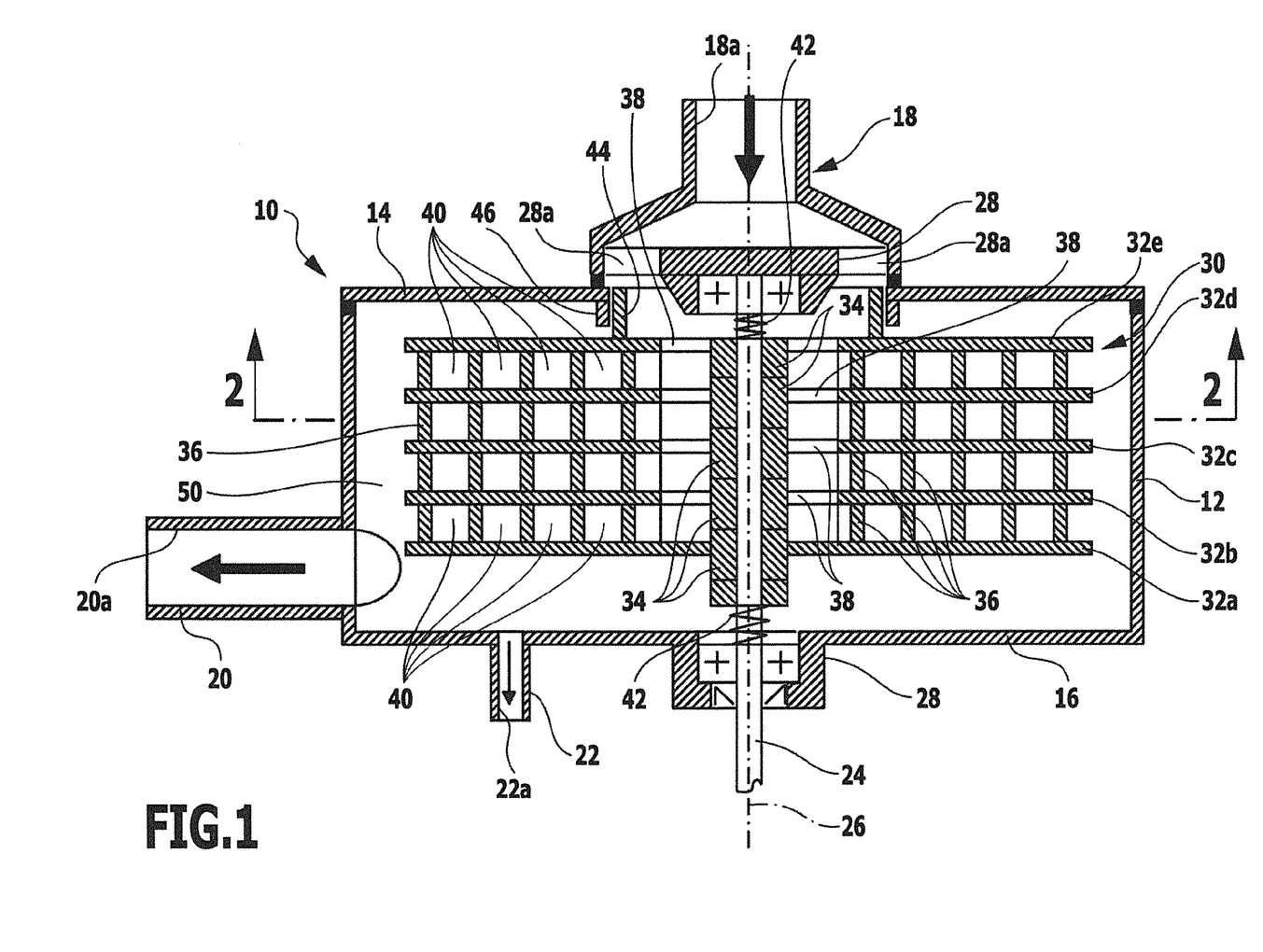
FIG. 1 represents a schematic sectional view of an embodiment of the separator constructed in accordance with the invention, with the sectional plane containing the rotor axis of the separator.

The separator illustrated in FIG. 1 has a multi-part housing 10 comprising a circumferential wall 12, an upper and a lower end wall 14 and 16 respectively and a hood-like inlet connection 18, an outlet connection 20 and a drain connection 22, wherein the individual housing parts are connected together in a gas and liquid-tight manner, preferably by welding. In the embodiment illustrated, the inlet connection 18 forms a dirty gas inlet 18a, i.e. an inlet for the gas to be cleaned, the outlet connection 20 forms a clean gas outlet 20a for the cleaned gas and the drain connection 22 forms a liquid outlet 22a for liquid separated from the dirty gas by the separator.

However, the functions of the connections 18 and 20 may also be reversed, i.e. the connection 20 could form a dirty gas inlet and the connection 18 could form a clean gas outlet, in those instances where the gas to be cleaned is intended not to flow radially from inside out but from outside in through the rotor of the separator, to be described later.

A drive shaft 24 is mounted in the housing 10 for rotation about a rotor axis 26 and projects downwardly from the housing so that it can be caused to rotate by a motor or other drive device, not shown, preferably at a rotational speed in the range of 5,000 to 10,000 revolutions per minute. The drive shaft 24 is supported by an upper and a lower bearing device 28, with the lower bearing device being accommodated in the lower end wall 16, while the upper bearing device is held by the inlet connection 18 via radial webs 28a arranged in a star-shaped configuration, and it is between these webs 28a that the dirty gas to be cleaned can flow downward.

The housing 10 encloses a rotor 30 which in the embodiment illustrated is formed by five flat and in particular planar disk bodies 32a to 32e, a plurality of sleeves 34 having the drive shaft 24 extending therethrough, web-like channel walls 36, and webs 38 arranged in a star-shaped configuration. Each of the disk bodies 32a to 32e is fixedly connected to one of the sleeves 34 via a set of webs 38 which are arranged in a star-shaped configuration and lie in a plane, and for simplicity in the following, we will assume that in each case the channel walls 36 arranged between two disk bodies adjacent to one another are fixedly connected to or integrally formed with the respective lower disk body, but in each case completely span an axial interspace between two disk bodies adjacent to one another, i.e. the axial height of the channel walls 36 equals the axial distance of the disk bodies adjacent to one another. Thus, in this embodiment, the lowermost disk body 32a together with the channel walls 36 extending upwardly therefrom forms a disk of the rotor 30, and the same applies to the disk bodies 32b to 32d, whereas the disk body 32e only forms an upper bound for the rotor 30. Between the disk bodies 32a to 32e, the channel walls 36 thus define channels 40, the geometry of which will be discussed in more detail below.

The sleeves 34 are connected to the drive shaft 24 so as to be at least rotationally fixed with respect thereto, but preferably also so as to be undisplaceable in the direction of the rotor axis 26, i.e. so as then to be fixedly connected to the drive shaft 24, and this may be accomplished by for example press-fitting or shrink-fitting the sleeves 34 onto the drive shaft 24. Where the sleeves 34 are only rotationally fixed to the drive shaft 24, helical springs 42 surrounding the drive shaft 24 may be provided, as indicated in FIG. 1, in order to secure the rotor 30 in an axial direction to the drive shaft 24.

Fixed to the upper disk body 32e and to the upper end wall 14 is an annular wall 44 and 46 respectively, configured and arranged concentrically relative to the rotor axis 26, with the two annular walls 44 and 46 overlapping each other in an axial direction and intended to form a type of labyrinth seal therebetween in order for the dirty gas to be cleaned that is fed to the separator via the dirty gas inlet 18a to be admitted to the rotor 30 only in a central region thereof which is located between the sleeves 34 and the openings of the disk bodies 32a to 32e spanned by the webs 38.

As is apparent from FIG. 1, the circumferential wall 12 of the housing 10 encloses an annular space 50 between the outer circumference of the rotor 30 and the housing 10, and leaving aside the connections 18, 20 and 22 as well as the shape, to be described hereinafter, of the channel walls 36 and channels 40, the separator is generally rotationally symmetric relative to the rotor axis 26.

Figure 2:
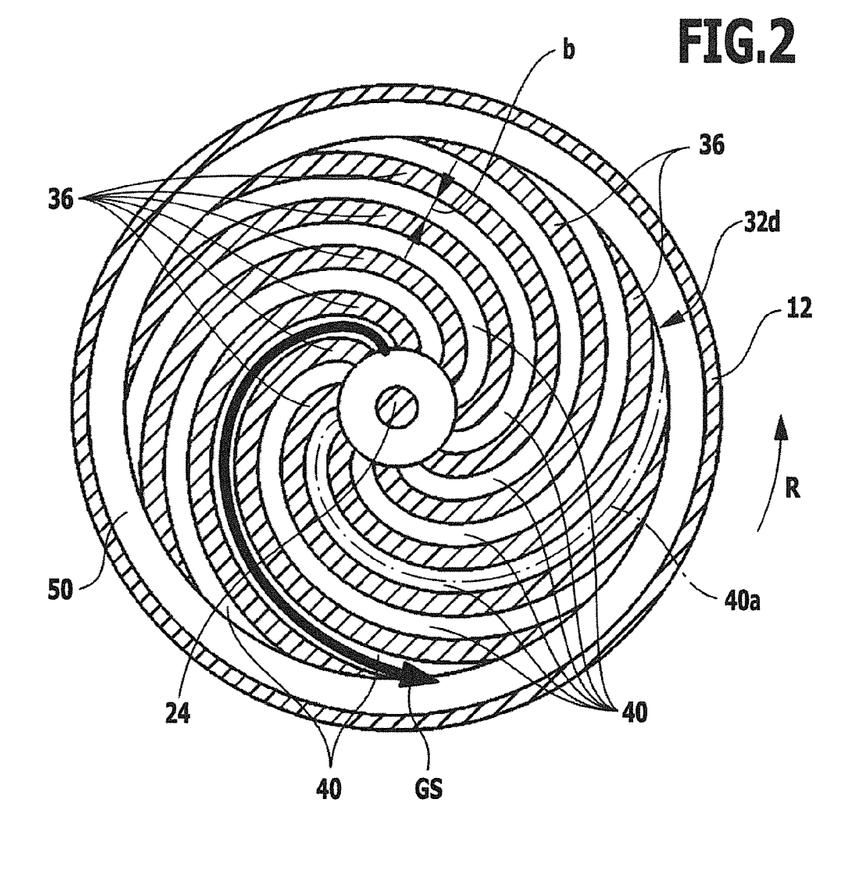
FIG. 2 is a section along line 2-2 of FIG. 1 taken through an embodiment having channels extending along an involute path.

In the interest of clarity, the sectional view along line 2-2 in FIG. 1, shown in FIG. 2, has been somewhat simplified and shows only the housing's circumferential wall 12, the annular space 50, the disk body 32d, the drive shaft 24 and a plurality of identically configured channel walls 36 and channels 40.

In the preferred embodiment illustrated in FIG. 2, the channel walls 36 and therefore the channels 40 are of involute configuration, meaning that the center line of a channel 40 located between two channel walls adjacent to one another forms a portion of an involute; such a center line is indicated by a dot-dash line in FIG. 2 and designed 40a therein.

Furthermore, FIG. 2 illustrates the direction of rotational drive of the rotor 30, indicated therein by arrow R, and FIG. 2 shows in one of the channels 40 an arrow labeled GS, which indicates the path a partial gas stream of the gas to be cleaned takes in that channel. Although the rotor 30 may also be driven to rotate in a direction opposite to that shown, this results in lower separation efficiency of the separator.

As can be seen from FIG. 2, each of the channels 40 has a constant channel width over the entire length thereof, and in the preferred embodiment the width of all of the channels 40 is made the same size and the wall thickness of all of the channel walls 36 is made the same size and is the same everywhere.

Figure 3:
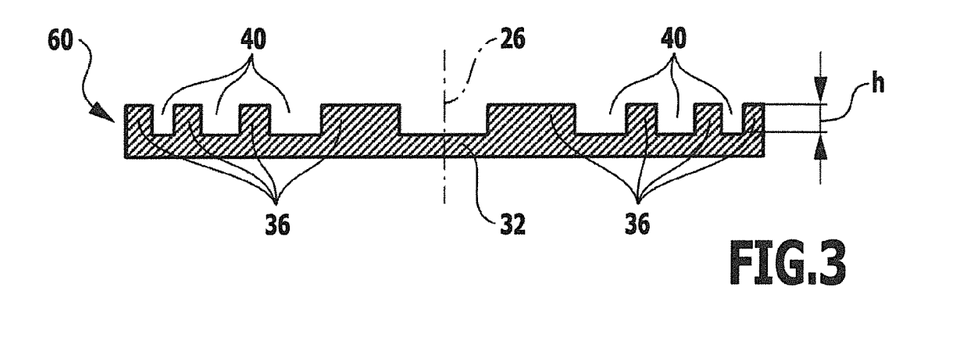
FIG. 3 is a greatly schematized and simplified representation of a disk of a separator constructed in accordance with the invention, again shown in a section along a plane containing the rotor axis.

A disk 60 of a separator constructed in accordance with the invention, only schematically illustrated in FIG. 3, has a planar disk body 32 having integrally formed thereon channel walls 36 which form channels 40 therebetween. The rotor axis 26 also forms the central axis of the disk 60 and therefore the central axis of all of the disk bodies 32a to 32e. It should be pointed out that the widths of the channels 40 as are apparent from FIG. 3 are only different because a section through the disks or disk bodies along a diametrical plane containing the rotor axis 26 intersects the channels 40 in radially inner areas of the disks at a different angle than it does in radially outer areas of the channels; however, the width b of the channels 40 is to be taken to mean the distance between the two wall surfaces, bounding a channel, of two channel walls 36, said distance being in each case measured perpendicularly to two wall surface portions of these two channel walls opposite one another.

On the other hand, the height of the channels 40 is to be taken to mean the projection of the channel walls 36 above the disk body 32, measured perpendicularly to the plane of the disk body 32; in FIG. 3, the channel height is designated by "h". At least in preferred embodiments of the separator constructed in accordance with the invention, the channel height h is substantially larger than the channel width b and is in particular a multiple of, preferably no more than five times, the channel width.

The mechanism of action of the separator constructed in accordance with the invention will now be explained with reference to FIG. 5.

Figure 5:
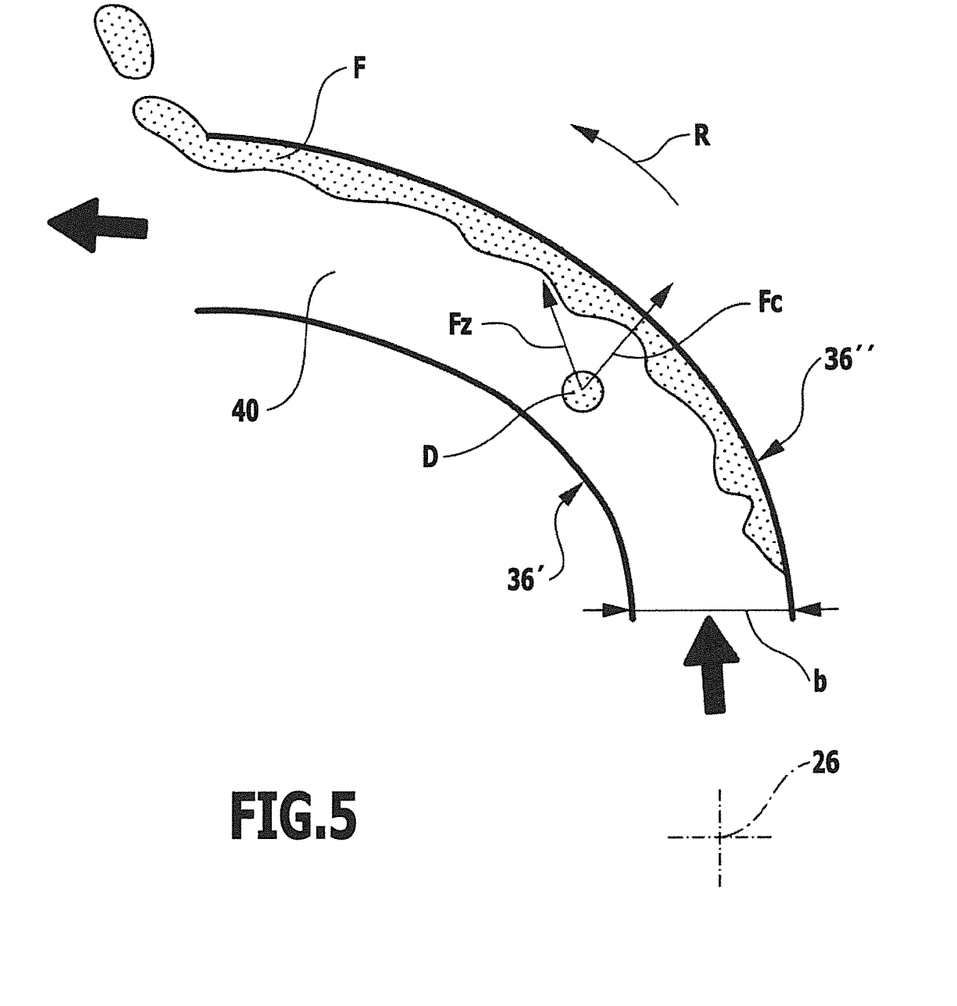
FIG. 5 is a greatly simplified top view of a channel in the embodiment shown in FIG. 2, for the purpose of describing the separation mechanism of the separator constructed in accordance with the invention.

FIG. 5 shows, in much shortened form, a channel 40 following an involute course; it is bounded by a radially inner channel wall 36' and a radially outer channel wall 36", with each of the two channel walls being shown by a single line only. The direction of flow of the partial gas stream of the gas to be cleaned flowing through the channel 40 is indicated by fat arrows, and the direction of rotation of the rotor is again indicated by an arrow labeled R. As the rotor rotates, a liquid droplet D to be separated, entrained by the partial gas stream, is subjected to the centrifugal force indicated by arrow Fz, with the direction of said force Fz being in a radial direction relative to the rotor axis 26, and is subjected to the Coriolis force indicated by arrow Fc, the orientation of said force Fc being perpendicular to both the direction of motion of the liquid droplet D and the axis of rotation of the reference frame, that is the rotor axis 26. By the centrifugal force Fz alone, the liquid droplet D is already urged against the channel wall 36", and this effect is further enhanced by the Coriolis force Fc. Thus, in a separator constructed in accordance with the invention, the channel wall 36" acts as an impaction and separating surface for the liquid droplets to be separated, entrained by the gas stream, these separating out on the channel wall 36" and forming thereon a liquid film F or at least larger liquid accumulations which are then, by the centrifugal force, at the radially outer end of the channel 40, spun off the rotor 30 into the annular space 50 and are, at least for the most part, caused to impact against the housing circumferential wall 12, where the separated liquid drains down by gravity force and exits the housing 10 through the liquid outlet 22a.

The foregoing applies not only to channels extending along an involute course but also to channels that are curved to approximately correspond to the curvature of another spiral or an arc of a circle.

As contrasted to a separator having conical disks, the liquid droplets to be separated from the gas flow are thus at least nearly exclusively separated out on the channel wall surfaces, which in a section containing the rotor axis 26 are oriented at least nearly parallel to the rotor axis and therefore form impaction surfaces that are far more efficient than impaction and separating surfaces which extend conically relative to the rotor axis.

Figure 4:
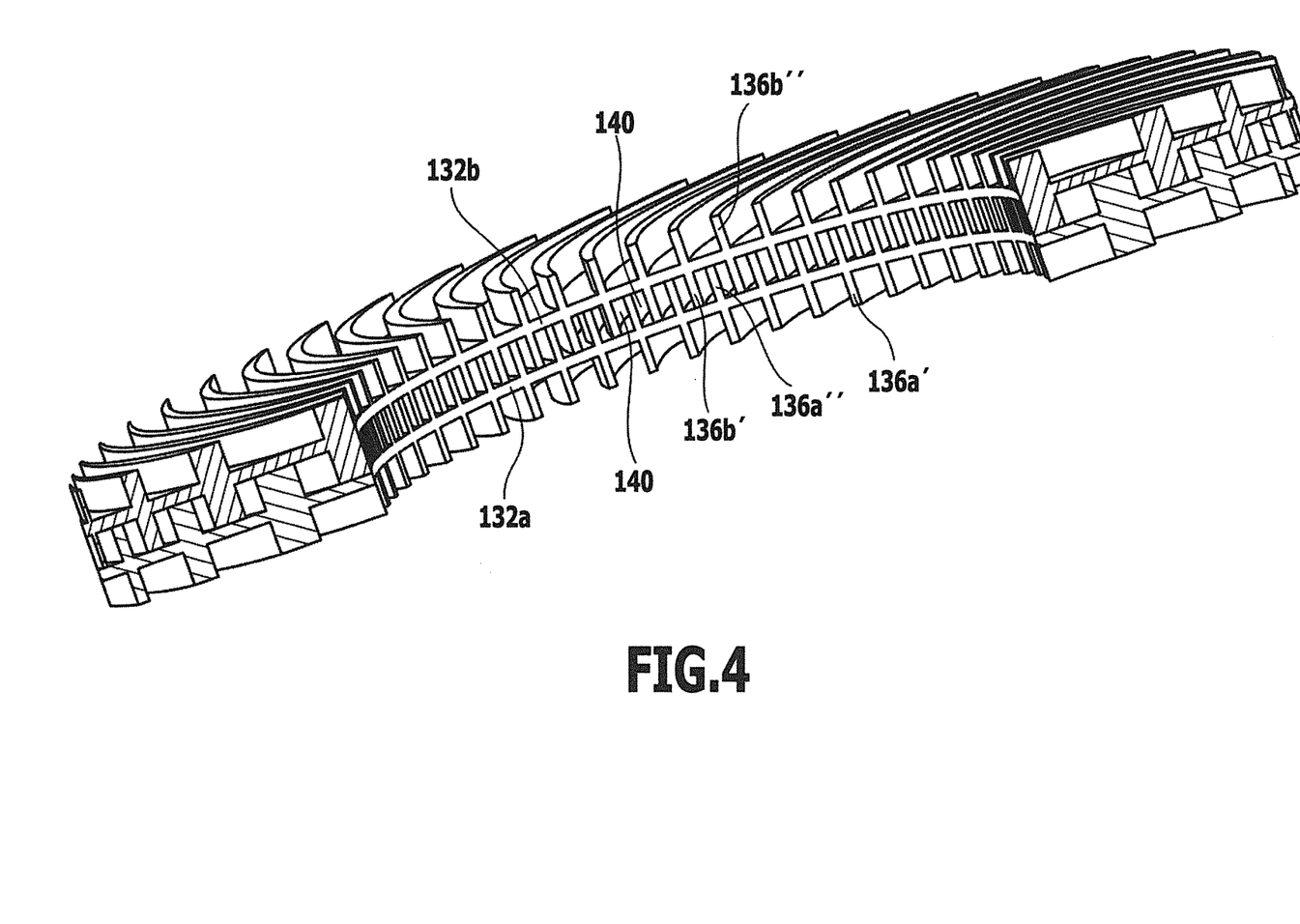
FIG. 4 is an isometric view of two disks adjacent to each other in a particularly preferred embodiment of the separator constructed in accordance with the invention, illustrating only an approximately 180° circumferential portion of these two disks in order to enable showing the disk assembly also in a section, with the sectional plane containing the rotor axis or the latter extending parallel to the sectional plane.

In the particularly preferable embodiment illustrated in FIG. 4, flat disk bodies 132a and 132b of two disks, adjacent to one another, of the rotor of a separator constructed in accordance with the invention have, on each of their two sides, web-like channel walls 136a', 136" and 136b', 136b" respectively, wherein the channel walls 136a", 136b' projecting into the interspace between the disk bodies 132a and 132b adjacent to each other have an axial height which is at least nearly equal to the axial distance of the two disk bodies 132a and 132b from each other and the channel walls of the one disk body are located centrally (in a circumferential direction of the rotor) between two channel walls adjacent to each other of the other disk body. In this way, channels 140 of a channel width b which is only a little less than half the width of the interspaces between channel walls adjacent to one another of a single disk are created between the channel walls 136a", 136b' so that narrow channels formed in the interspaces between two disk bodies adjacent to each other are easier to implement in terms of fabrication techniques.

Figure 6A:
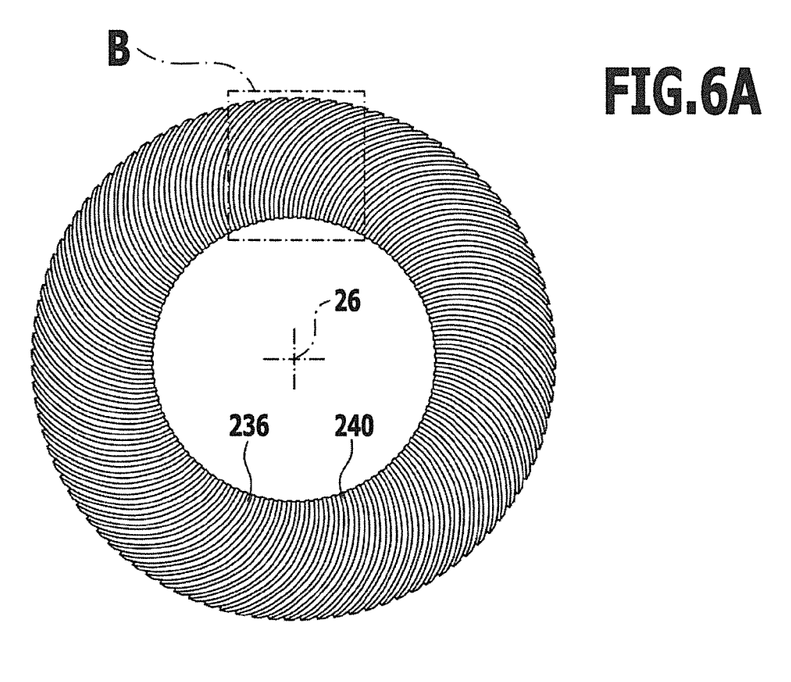
FIG. 6A is a representation corresponding to FIG. 2 of a further embodiment in which the channels have a circular arc-shaped course.
Figure 6B:
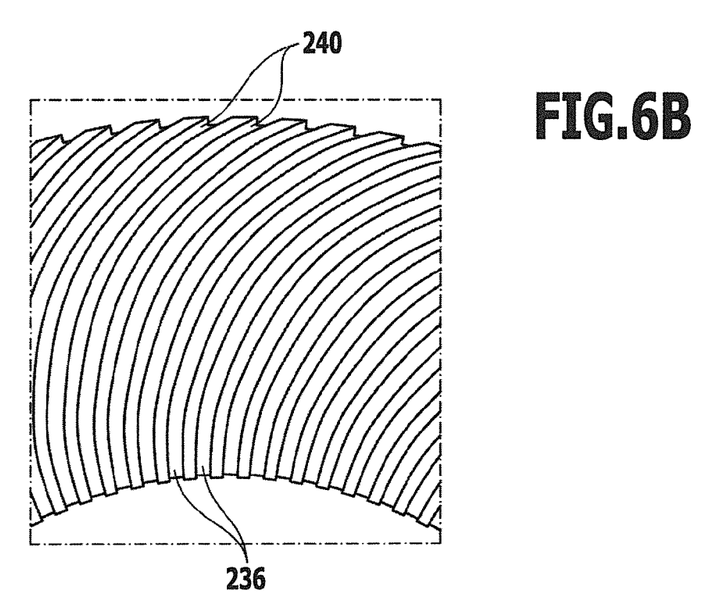
FIG. 6B is a view of the portion labeled B in FIG. 6A, drawn to a larger scale.

In FIGS. 6A and 6B, a further embodiment is shown only in a greatly simplified manner; here, the channel walls 236 and channels 240 formed between channel walls adjacent to one another extend along a circular arc-course (when seen in a direction of the rotor axis 26).

Figure 7:
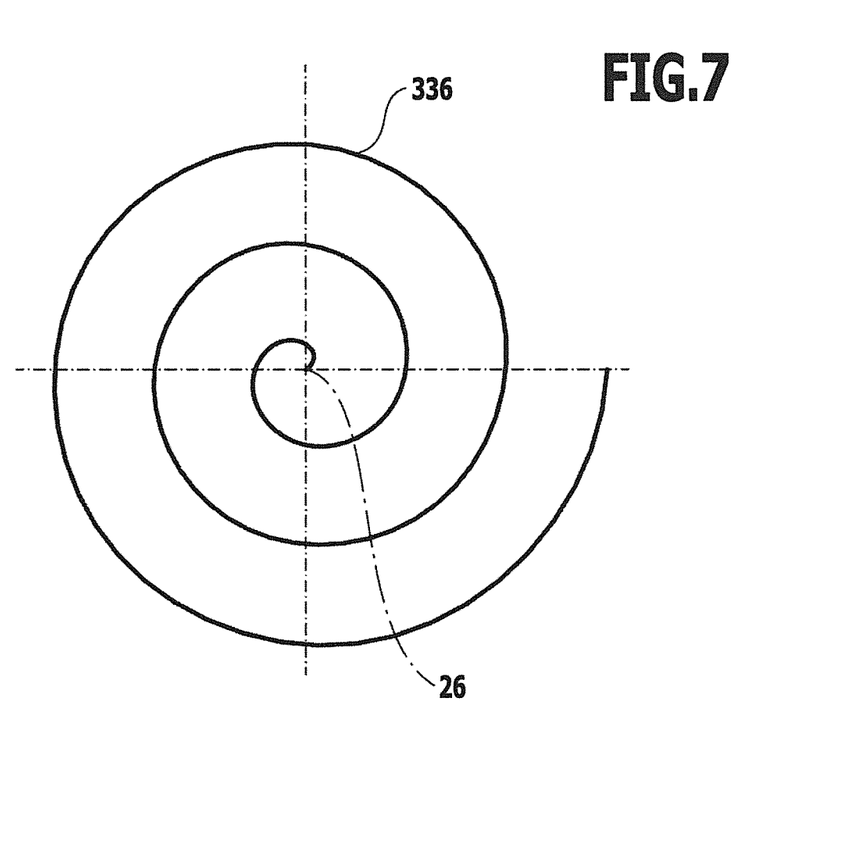
FIG. 7 is a representation of an Archimedean spiral which can also be a greatly simplified top view of a web-like wall extending between two channels, not drawn in the figure, in the interspace between two disks adjacent to each other of a separator constructed in accordance with the invention.

Finally, FIG. 7 shows an Archimedean spiral formed by a channel wall 336; therefore, channels formed between channel walls 336, not shown in FIG. 7, that are adjacent to each other also follow a course corresponding to that of an Archimedean spiral.

The invention claimed is:

1. A separator for separating liquid droplets from an aerosol, in particular an oil separator for the crankcase ventilation gases of a reciprocating internal combustion engine, comprising a rotor arranged in a stationary housing and capable of being driven in rotation about a rotor axis, said rotor comprising a plurality of disks which are concentric with the rotor axis and are arranged parallel to one another, said disks together forming a stack of disks capable of being driven in rotation about the rotor axis and being arranged at in particular equal distances relative to one another in a direction of the rotor axis, a gas flow path between a dirty gas inlet of the separator for a gas entraining liquid droplets to be separated and a clean gas outlet of the separator for the gas cleaned, at least to a large extent, of the liquid droplets, a liquid outlet for discharging separated liquid from the housing, and an annular space between the circumference of the rotor and a circumferential wall of the housing enclosing the rotor, wherein the liquid outlet is in communication with the annular space and disks adjacent to each other in each case form therebetween an interspace that is concentric with the rotor axis and through which the gas is to flow, the radially outer area of said interspace opening into the annular space, and wherein one of the dirty gas inlet and the clean gas outlet is in communication with the annular space and the other one of the dirty gas inlet and the clean gas outlet is in communication with radially inner areas of the interspaces, wherein the disks have flat disk bodies which extend in planes perpendicular to the rotor axis, wherein in each of at least a plurality of said interspaces there are provided a plurality of channels adjacent to one another and allowing passage therethrough of the gas to be cleaned, wherein each channel extends at least substantially from a first radial area to a second radial area of the interspace, with the two areas being arranged at a radial distance from each other, wherein each channel is curved when viewed in a direction of the rotor axis, and wherein between channel wall surfaces bounding the channel width on either side are provided, the radially outer one of said channel wall surfaces forming an impaction an separation surface for the liquid droplets entrained by the gas to be cleaned.

2. The separator in accordance with claim 1, wherein all of the channels extend at least substantially from a radially inner area to a radially outer area of the interspace.

3. The separator in accordance with claim 1, wherein each of the channels is continuously curved.

4. The separator in accordance with claim 1, wherein each channel, starting from its radially inner end, bends in a circumferential direction of the rotor and is curved such that with increasing radial distance from the rotor axis, the direction of the channel forms an increasingly smaller angle with this circumferential direction of the rotor.

5. The separator in accordance with claim 4, wherein this circumferential direction of the rotor is the direction of rotation thereof.

6. The separator in accordance with claim 1, wherein when viewed in a direction of the rotor axis, each channel is bounded by two channel walls and a center line of the channel extending between the channel walls forms at least approximately at least a portion of one of a spiral and a circular arc.

7. The separator in accordance with claim 6, wherein the spiral is an involute or an Archimedean spiral.

8. The separator in accordance with claim 1, wherein when viewed in a direction of the rotor axis, each channel has a width that is at least nearly constant along the channel.

9. The separator in accordance with claim 8, wherein along the length of a channel, the width thereof does not vary by more than ¼ of the mean channel width.

10. The separator in accordance with claim 1, wherein when viewed in a direction of the rotor axis, the channel width is no greater than 15 mm.

11. The separator in accordance with claim 1, wherein when viewed in a direction of the rotor axis, the channel width is at least 0.1 mm.

12. The separator in accordance with claim 1, wherein in an interspace, the height of the channels as measured in a direction of the rotor axis is constant.

13. The separator in accordance with claim 12, wherein the height of all of the channels provided in all of the interspaces is the same size.

14. The separator in accordance with claim 1, wherein each channel is bounded by two channel walls that are at least substantially parallel to each other.

15. The separator in accordance with claim 14, wherein the channel walls extend along a course transverse to a plane defined by a disk body.

16. The separator in accordance with claim 1, wherein the channel height is substantially larger than the channel width and is in particular approximately a multiple of the channel width.

17. The separator in accordance with claim 1, wherein the height, as measured in a direction of the rotor axis, of the channel wall surfaces provided between two disk bodies adjacent to one another is at least nearly equal to the axial distance of these disk bodies from each other.

18. The separator in accordance with claim 1, wherein channels adjacent to one another have in each case a wall of at least substantially constant wall thickness extending therebetween.

19. The separator in accordance with claim 1, wherein at least two disk bodies adjacent to each other are provided, on the sides thereof facing each other, with web-shaped walls which form said channel wall surfaces and, when viewed in a direction of the rotor axis, extend along a course corresponding to the shape of the channels, wherein the height of these walls, measured in a direction of the rotor axis, is at least nearly equal to the axial distance of these disk bodies from each other, and wherein when seen in a direction of the rotor axis, in at least a plurality of channels the walls of the one disk body are at least substantially centrally arranged between the walls of the other disk body.

20. The separator in accordance with claim 1, wherein the disks are injection-molded plastic parts.

21. The separator in accordance with claim 16, wherein the ratio of channel height to channel width is no greater than 5.

22. A method for separating liquid droplets from an aerosol, in particular for separating oil droplets from crankcase ventilation gases of a reciprocating internal combustion engine, by way of a separator comprising a rotor arranged in a stationary housing and capable of being driven in rotation about a rotor axis, said rotor comprising a plurality of disks each of which having a flat disk body extending perpendicularly to the rotor axis and being concentric with the rotor axis, said disk bodies being arranged parallel to one another and axially spaced apart from one another in a direction of the rotor axis, said disks forming between each pair of adjacent disks an interspace concentric with the rotor axis, wherein a plurality of partial gas streams formed by the gas to be cleaned are directed along flow paths extending at least substantially from a radially inner to a radially outer area of each of said interspaces and are flowed simultaneously between said flat disk bodies through the interspaces, wherein in a view of a disk in a direction of the rotor axis said flow paths are adjacent to one another and are curved in the same sense such that when the rotor rotates, liquid droplets entrained in the partial gas streams are, by the centrifugal and Coriolis forces acting upon them, at least for the most part separated out on impaction surfaces which bound the flow paths outwardly in a radial direction.

* * * * *

UNITED STATES PATENT AND TRADEMARK OFFICE
CERTIFICATE OF CORRECTION

PATENT NO. : 9,670,808 B2
APPLICATION NO. : 14/549864
DATED : June 6, 2017
INVENTOR(S) : Gorbach et al.

Page 1 of 1

It is certified that error appears in the above-identified patent and that said Letters Patent is hereby corrected as shown below:

In the Claims

At Column 11, Claim 1, Line 58, the text "between channel wall surfaces bounding" should be changed to -- channel wall surfaces bounding --

At Column 11, Claim 1, Line 60, the text "forming an impaction an separation surface" should be changed to -- forming an impaction and separation surface --

Signed and Sealed this
Fifth Day of December, 2017

Joseph Matal
*Performing the Functions and Duties of the*
*Under Secretary of Commerce for Intellectual Property and*
*Director of the United States Patent and Trademark Office*